(12) United States Patent
Costantini

(10) Patent No.: US 6,768,771 B1
(45) Date of Patent: Jul. 27, 2004

(54) MULTIMODE MODEM WITH AUTOMATIC NEGOTIATION OF OPERATIONAL MODE

(75) Inventor: Frank A. Costantini, Swedesboro, NJ (US)

(73) Assignee: L3-Communications Corporation, New York, NY (US)

(*) Notice: Subject to any disclaimer, the term of this patent is extended or adjusted under 35 U.S.C. 154(b) by 0 days.

(21) Appl. No.: 09/577,699

(22) Filed: May 23, 2000

(51) Int. Cl.$^7$ .................... H04L 5/16; H04M 11/00
(52) U.S. Cl. ..................... 375/222; 379/93.33
(58) Field of Search ................ 375/222, 220, 375/219

(56) References Cited

U.S. PATENT DOCUMENTS

| | | | |
|---|---|---|---|
| 4,920,567 A | 4/1990 | Malek | 380/33 |
| 4,931,250 A | 6/1990 | Greszczuk | 375/8 |
| 5,245,560 A * | 9/1993 | Cunningham et al. | 354/715.11 |
| 5,341,426 A | 8/1994 | Barney et al. | 380/21 |
| 5,349,635 A | 9/1994 | Scott | 379/97 |
| 5,404,394 A | 4/1995 | Dimolitsas et al. | 379/100 |
| 5,633,890 A | 5/1997 | Ahmed | 375/219 |
| 5,724,414 A | 3/1998 | Dimolitsas et al. | 379/100.17 |
| 5,732,104 A | 3/1998 | Brown et al. | 375/222 |
| 5,796,808 A * | 8/1998 | Scott et al. | 379/93.31 |
| 5,963,621 A * | 10/1999 | Dimolitsas et al. | 379/93.08 |
| 5,963,622 A * | 10/1999 | Walsh | 379/93.33 |
| 6,122,071 A * | 9/2000 | Yoshida | 358/434 |

* cited by examiner

Primary Examiner—Stephen Chin
Assistant Examiner—Lawrence Williams
(74) Attorney, Agent, or Firm—Woodcock Washburn LLP

(57) ABSTRACT

Apparatus and methods for determining an operational mode of a far-end modem are disclosed. Where the multimode modem is a call initiator, a method according to the invention includes transmitting a V.8 ANS$_{am}$ tone to the far-end modem, receiving a response signal from the far-end modem, and determining from the response signal whether the far-end modem is a commercial modem or a secure modem. Where the multimode modem is a call responder, a method according to the invention includes transmitting to the far-end modem a P1800 Hz tone with phase reversals, receiving a response signal from the far-end modem, and determining from the response signal whether the far-end modem is a commercial modem or a secure modem.

20 Claims, 4 Drawing Sheets

MULTIMODE MODEM WITH AUTOMATIC NEGOTIATION OF OPERATIONAL MODE

STATEMENT REGARDING FEDERALLY SPONSORED RESEARCH OR DEVELOPMENT

This invention was made with Government support under contract number MDA 904-98-G-0196 awarded by the Maryland Procurement Office. The Government has certain rights in the invention.

FIELD OF THE INVENTION

The present invention relates generally to modems. More particularly, the present invention relates to multimode modems with automatic negotiation of operational mode.

BACKGROUND OF THE INVENTION

Secure telephony devices use integral modems to transfer an encrypted digital bitstream representing the user's voice or other data across standard telephone networks. The most widely built and used secure telephone is the STU-III (Secure Terminal Unit, third generation) which was developed for the U.S. Government. A typical STU-III supports data transfers up to 9600 bps, and encodes and encrypts speech using federal-standard voice coders. The STU-III modem complies with a unique signaling plan, known as Future Secure Voice System ("FSVS") Terminal Performance specification 210 ("FSVS 210"), which was developed for the National Security Agency.

Commercially available modems, which offer performance well in excess of 9600 bps, are based on standards developed by the International Telecommunication Union (ITU), which are documented in the ITU's V.series recommendations. Commercial modems complying with Recommendations V.32, V.34, and V.90 are the most prevalent.

In certain applications, it is desirable that a single device be able to communicate interchangeably with either a secure modem or a commercial modem. It is well known, however, that the modem characteristics specified in FSVS-210 for STU-III interoperation are not compatible with the ITU V.series modem. Although a single device could conceivably communicate with both STU-III and ITU V.series modems with a priori knowledge of the far-end modem's modes of operation, such a solution is impractical since the characteristics of a far end device usually are not known. It would be advantageous therefore, if a single device could communicate with both STU-III and ITU V.series modems without a priori knowledge of whether the far-end modem is a commercial modem or a secure modem, or of the far-end modem's operational mode. Thus, there is a need in the art for a multimode modem that can automatically determine and negotiate operational mode of a far-end modem.

SUMMARY OF THE INVENTION

The present invention satisfies these needs in the art by providing apparatus and methods for determining an operational mode of a far-end modem.

Where the multimode modem is a call initiator, a method according to the present invention for identifying a far-end modem type includes transmitting a V.8 $ANS_{am}$ tone to the far-end modem, receiving a response signal from the far-end modem in response to the transmitted V.8 $ANS_{am}$ tone, and determining from the response signal whether the far-end modem is a commercial (e.g., V.series) modem or a secure (e.g., FSVS) modem.

If the response signal is a V.8 CM tone, then the far-end modem is determined to be a V.8 modem. If, on the other hand, the response signal is not a V.8 CM tone, but rather, has a nominal frequency of about 1800 Hz, then the far-end modem can be either a V.32 modem or a secure modem.

If the response signal has a nominal frequency of about 1800 Hz, but does not include phase shifts, then the far-end modem is determined to be a V.32 modem. If, on the other hand, the response signal includes phase shifts, then the far-end modem is determined to be a secure modem.

If the far-end modem is determined to be a secure modem, then an operational mode of the far-end modem can be determined from the response signal. If the response signal includes phase reversals, then the far-end modem is determined to be an FSVS modem in alternate mode. If the response signal includes a 128 dibit gap, then the far-end modem is determined to be an FSVS modem in half-duplex mode. If the response signal does not include either phase reversals or a 128 dibit gap, then the far-end modem is determined to be an FSVS modem in interoperable mode.

This invention is possible since a commercial V.series modem is looking for energy at 1800 Hz. Since the transmission of an 1800 Hz tone with 45-degree phase reversals would violate V.32 specifications (which require a pure 1800 Hz tone), the V.series initiator will ignore the 45 degree phase shifts present in a P1800 Hz tone, and consider the tone to be the expected "AA" tone. Also, the V.series initiator ignores the phase reversals in the "alternate mode" P1800 Hz tone, which occur in the first 80 msec of reply, since it looks for phase reversals only after it transmits "AC", which can occur no sooner than 155 msec after the start of the P1800 Hz tone.

Where the multimode modem is a call responder, a method according to the present invention for identifying a far-end modem type includes transmitting to the far-end modem a P1800 Hz tone with phase reversals, receiving a response signal from the far-end modem in response to the transmitted P1800 Hz tone, and determining from the response signal whether the far-end modem is a commercial modem or a secure modem.

An incoming channel is simultaneously monitored for the presence of a V.8 $ANS_{am}$ tone, and for energy at either 1800 Hz or 2100 Hz. If a V.8 $ANS_{am}$ tone is present in the incoming channel, then the far-end modem is determined to be a V.8 modem. If 1800 Hz energy is present in the incoming channel for at least about one second, then the far-end modem is determined to be an FSVS modem operating in half-duplex mode. If 2100 Hz energy is present in the incoming channel for at least about one second, then the far-end modem can be either a V.32 modem, or an FSVS modem operating in either interoperable mode or alternate mode.

If the response signal includes a V.32 AC, then the far-end modem is determined to be a V.32 modem. If, on the other hand, the response signal includes an FSVS Message A, then the far-end modem is determined to be an FSVS modem in alternate signaling mode. If the response signal includes neither a V.32 AC nor an FSVS Message A, then the far-end modem is determined to be an FSVS modem in interoperable mode.

Apparatus according to the invention include computer-readable media having stored thereon computer executable instructions for performing any of the inventive methods.

BRIEF DESCRIPTION OF THE DRAWINGS

The foregoing summary, as well as the following detailed description of the preferred embodiments, is better understood when read in conjunction with the appended drawings.

For the purpose of illustrating the invention, there is shown in the drawings an embodiment that is presently preferred, it being understood, however, that the invention is not limited to the specific apparatus and methods disclosed.

DETAILED DESCRIPTION OF PREFERRED EMBODIMENTS

STU-III Full Duplex Modem Training

Figure 1:
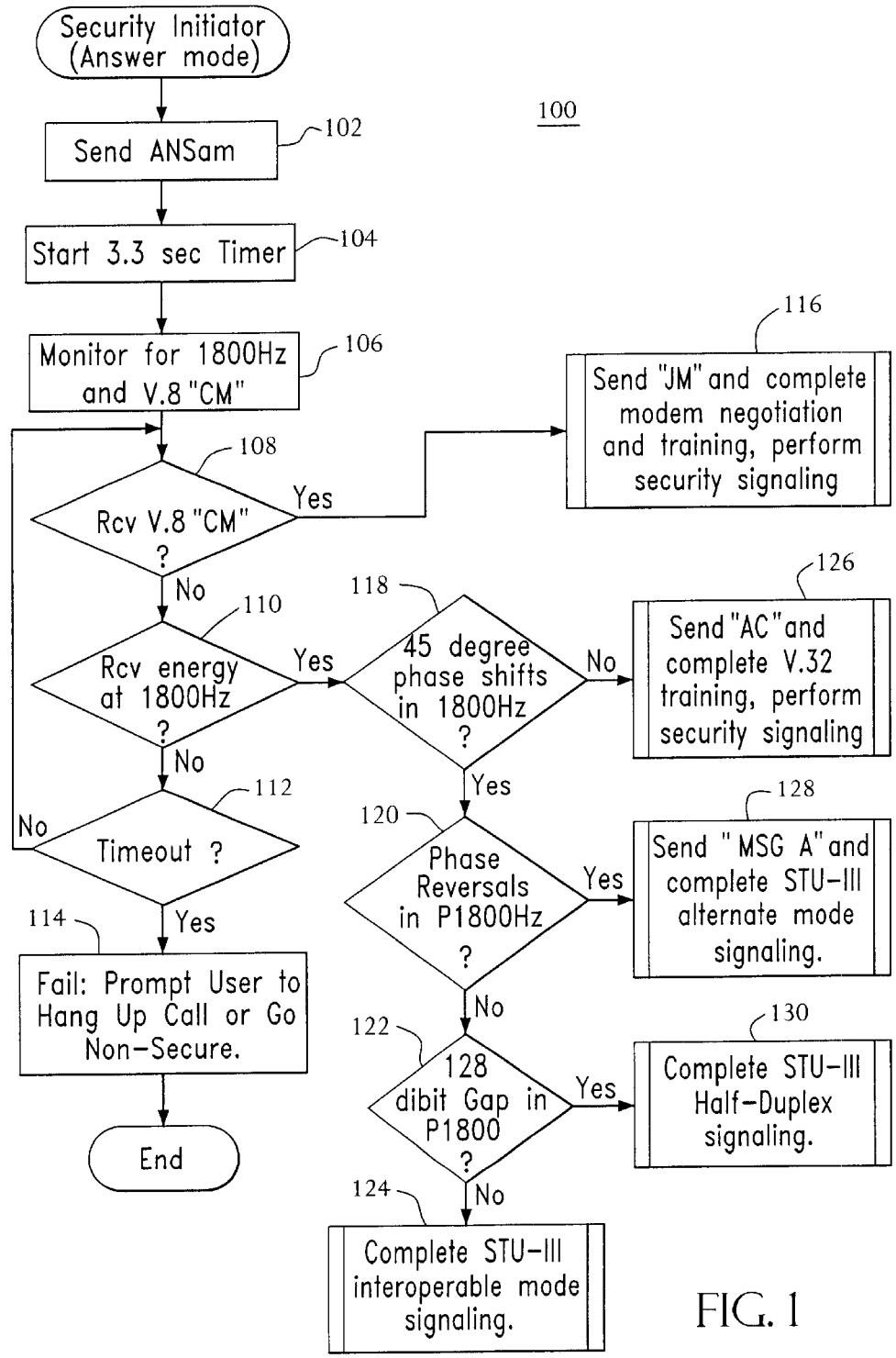
FIG. 1 is a flowchart of a method for initiating a call using a multimode modem with automatic negotiation of operational mode.

A secure STU-III call typically begins from a state where both parties are connected in a non-secure telephone conversation. To transition the call into a secure call, one of the users activates the security via their STU-III. This STU-III is commonly known as the "security initiator." A full-duplex STU-III initiator will transmit either a 2100 Hz echo suppressor disable (ESD) or a 2100 Hz echo suppressor canceller disable (ESCD) tone. The ESCD tone differs from the ESD tone in that the ESCD tone has phase reversals every 450 msec. Whether the ESD tone or the ESCD tone if used depends on the model of STU-III. Older STU-IIIs typically provide a strap setting for selecting either ESD or ESCD. Newer STU-IIIs typically do not include this strap setting, and send only the ESD tone.

Upon detection of at least 1 second of the received 2100 Hz tone, the far-end or responding STU-III (the "security responder") will transmit a pseudo-1800 Hz tone (P1800). The P1800 Hz tone is not a pure 1800 HZ sine wave, but rather, it is constructed by alternately transmitting dibits 0 and 2. This generates a tone with an average frequency of 1800 Hz, having alternating positive and negative phase shifts of 45 degrees every baud-time (which is typically about $1/1200$ sec, or 0.833 msec).

The P1800 Hz tone can be generated either as an "interoperable signaling mode" P1800 Hz tone, or as an "alternate signaling mode" P1800 Hz tone. If the responding STU-III supports "alternate mode" signaling, it will transmit three 180 degree phase reversals in the P1800 Hz tone at baud times 32, 64, and 96 (26.6, 53.3, and 80 msec, respectively). For "interoperable mode", no phase reversals are included in the P1800 Hz tone.

After detecting the responder's P1800 Hz tone, the initiating STU-III will wait 90 msec (108 baud-times), and then terminate transmission of the ESD or ESCD tone. If the responding STU-III transmitted phase reversals in the P1800 Hz tone, and the initiating STU-III also supports "alternate mode" signaling, the initiating STU-III will transmit an FSVS "Message A" 85 msec after termination of the ESD or ESCD tone.

After detecting the initiator's removal of the ESD or ESCD tone, the responder will continue transmitting the P1800 Hz for 150 msec (180 baud-times). If the start of Message A is not received by the responding STU-III during this time, it will transmit 4096 bits of Scrambled Ones (SCR1), followed by silence. This indicates "interoperable mode". If the start of Message A is received during the 150 msec, the responder will reply with an FSVS "Message B" and "alternate mode" signaling begins using training and modulation techniques similar to ITU V.32.

For "interoperable mode" signaling, the initiating STU-III trains its equalizer on the received SCR1, and on completion, the initiator sends the 2100 Hz tone again for 1 second followed by 4096 bits of SCR1, followed by silence. The responding STU-III trains its equalizer on the received SCR1 pattern then transmit 704 bits of SCR1 to indicate its readiness to exchange STU-III signaling messages. These signaling messages and the user data are transferred using modulation techniques similar to ITU-V.26 standards.

Half-duplex STU-III calls can be established by the initiator's transmitting an 1800 Hz tone instead of the 2100 Hz ESD/ESCD. Also, a responding STU-III can force a half-duplex mode by placing gaps in its P1800 Hz response.

V.32 Modem Training

V.32 modems can use V.8 or V.25 startup to initiate modem training. The V.8 process is described below for V.34/V.90 modems. V.32 modems using V.25 startup initiate modem training by transmitting a 2100 Hz tone with phase reversals. This tone is transmitted from the answer-mode modem, per the V.25 standard, and is referred to as the "ANS" tone. Note that when ITU-V.series modems are used in a secure telephony application, the security initiator is the "answer-mode" modem as defined in the ITU standards.

Upon detecting the ANS tone, the calling mode modem replies to the ANS tone, after one second, with an "AA" pattern. This pattern is a fixed, 1800 Hz sinusoid, without phase shifts or reversals.

After receiving at least 100 msec of the "AA" pattern, the answer-mode modem terminates transmission of the ANS tone, waits 75 msec, and transmits the "AC" pattern, which is either a 600 Hz or a 3000 Hz signal, for at least 64 baud times (2400 baud/sec), after which it switches to transmitting the "CA" pattern. This switch from "AC" to "CA" results in a 180 degree phase reversal in the answer-mode transmitted signal.

Upon detecting the "AC" to "CA" phase reversal, the calling-mode modem delays 64 baud-times, and changes from transmitting "AA" to "CC". This results in 180-degree phase reversal in the 1800 Hz sinusoid.

Upon detecting The "AA" to "CC" phase reversal, the answer-mode modem waits 64 baud-times, then switches to transmitting the "AC" pattern again resulting in another phase reversal.

The calling mode modem, upon detecting the "CA" to "AC" phase reversal, terminates transmission of the "CC" pattern. The answer-mode modem detects the end of the received "CC" pattern, terminating transmission of "AC", and then begins echo cancellation training.

V.34/V.90 Modem Training

V.34 and V.90 modems always employ V.8 signaling to start a connection. Like V.25, V.8 starts with a 2100 Hz answer tone. In V.8 signaling, however, this answer tone is amplitude modulated at a +/− 20% level by a 15 Hz signal, and is therefore referred to as "$ANS_{am}$". A V.8-compliant DCE, upon detecting the modulation of the answer tone, will proceed with V.8 signaling, whereby modem capabilities are negotiated before modem training using a 300 bps V.21-based exchange. The allowed modem families that can be negotiated with V.8 include V.22, V.23, V.26, V.27, V.32, V.34, and V.90. After the common modem capabilities are determined, the modem training process begins. If a V.8-compatible modem receives the V.25 ANS tone (with no amplitude modulation), it will transition to V.32/V.32bis mode.

Automatic Modem Negotiation

A method according to the invention will now be described for an auto-negotiating modem that can determine which signaling data link layer modem (STU-III 2400, STU-III 4800/9600, standard V.32, or V.34/V.90) to engage based on the results of modem training. Two scenarios are described: the auto-negotiating modem as the initiator (answer-mode modem), and the auto-negotiating modem as the responder (call-mode modem).

Security Initiator

FIG. 1 is a flowchart of a method 100 for initiating a call using a multimode modem with automatic negotiation of operational mode. At step 102, the auto-negotiating multi-mode modem initiates full duplex modem training by transmitting an ANSam tone in accordance with V.8 for an answer-mode modem. The initiator waits, at step 104, for a response signal from the responder by starting a 3.3 second timer, in accordance with the V.25 specification, and monitoring the environment, at step 106, for the presence of either energy at 1800 Hz or a V.8 "CM" pattern.

If, at step 108, the initiator receives the V.8 "CM" pattern, then the far-end modem is identified as being V.8-compatible. If desirable, modem negotiation can then proceed, at step 116, using the V.8 protocol. The initiator replies to the response signal by sending a V.8 "JM" pattern to the far-end modem. Modem training in accordance with the negotiated modem mode is completed, and the appropriate security signaling is performed.

If, at step 110, the initiator detects the presence of energy at 1800 Hz, the initiator identifies the far-end modem as either a secure modem (STU-III), or a V.32 commercial modem. To determine which of these the far-end modem is, additional characteristics of the response signal are determined.

At step 118, the initiator determines whether the received 1800 Hz response signal is a V.32 "AA" by looking for phase shifts in the response signal. If the response signal has no phase shifts, then, after receiving 100 msec of the "AA" pattern, the initiator proceeds, at step 126, with V.32 signaling by transmitting the "AC" pattern to the responder. The initiator continues with V.32 signaling and training, and uses the appropriate security signaling to complete the secure connection.

If, at step 118, the initiator determines that the 1800 Hz response signal does include phase shifts of about 45 degrees, then the initiator determines that the response signal is P1800 Hz, and that the responder is a STU-III. If the initiating auto-negotiating multi-mode modem receives a STU-III P1800 Hz tone in response to the ANSam tone it will proceed with STU-III signaling.

To determine the operating mode of the far-end STU-III, the initiator first determines, at step 120, the whether the response signal includes phase reversals. If, at step 120, the initiator determines that the response signal is a P1800 Hz signal with phase reversals, then the initiator determines that the responder is a STU-III in alternate mode. At step 128, the initiator completes STU-III alternate mode signaling by terminating the $ANS_{am}$ tone (which appears to the far-end STU-III to be ESCD) 90 msec after detecting P1800 and then transmitting Message A after 85 msec. The initiator then waits for Message B from the responder.

If, at step 120, the initiator determines that the P1800 Hz signal does not includes phase reversals, then the initiator determines, at step 122, whether the far-end STU-III is in half-duplex mode or interoperable mode by determining whether a 128 dibit gap is present in the P1800 Hz tone. If the dibit gap is not present, then the initiator determines that the responder is a STU-III in interoperable mode and, at step 124, completes interoperable mode signaling and then waits for SCR1 from the responder.

If, at step 122, the initiator determines that there is a 128 dibit gap in the P1800 Hz tone, then the initiator determines that the responder is a STU-III operating in half-duplex mode and, at step 130, completes half-duplex signaling.

If, at step 112, the initiating auto-negotiating multi-mode modem receives neither a V.8 "CM" nor energy at 1800 HZ in response to the transmitted $ANS_{am}$ tone within approximately 3.3 seconds, it will timeout and, at step 114, indicate a secure connection failure.

An auto-negotiating multi-mode modem, when initiating half-duplex calls, will follow the STU-III half duplex initiation protocol by outputting a P1800 signal instead of a 2100 Hz ESCD tone.

Modem Responder

Figure 2:
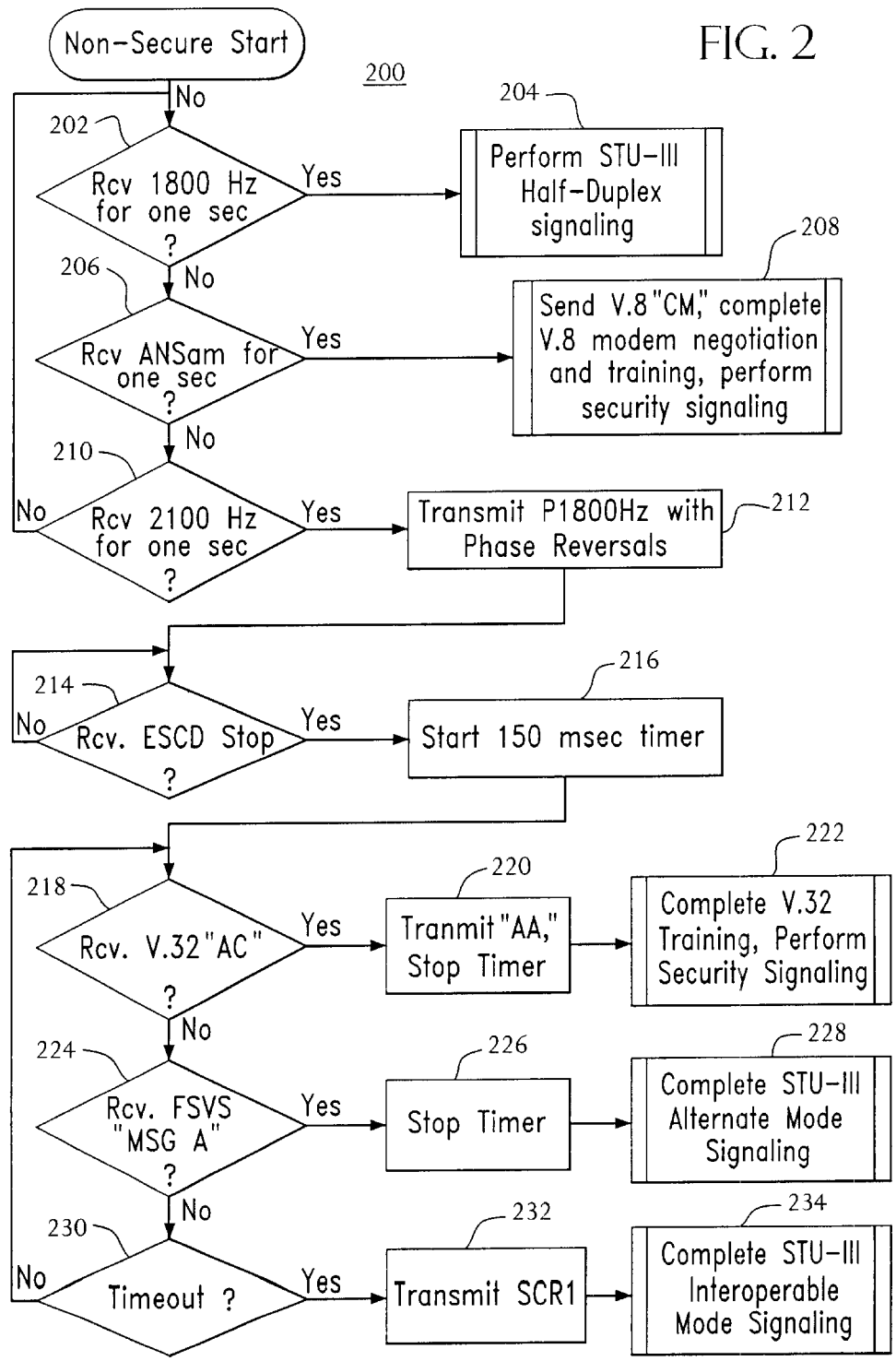
FIG. 2 is a flowchart of a method for responding to a call using a multimode modem with automatic negotiation of operational mode.

FIG. 2 is a flowchart of a method 200 for responding to a call using a multimode modem with automatic negotiation of operational mode. While in a non-secure call, the auto-negotiating multi-mode modem continuously monitors for two signals from the telephone line to which it is coupled: a 2100 Hz ESD/ESCD/V.8 tone indicating far-end modem initiation, and a P1800 Hz tone for far-end half-duplex STU-III mode initiation.

If, at step 202, the multimode modem determines that it has received a P1800 Hz for 1024 bit times followed by a gap of 128 dibits, then the responder determines that the initiator is a STU-III in half-duplex mode. At step 204, the multimode modem performs STU-III half-duplex signaling in the responder role.

Figure 3A:
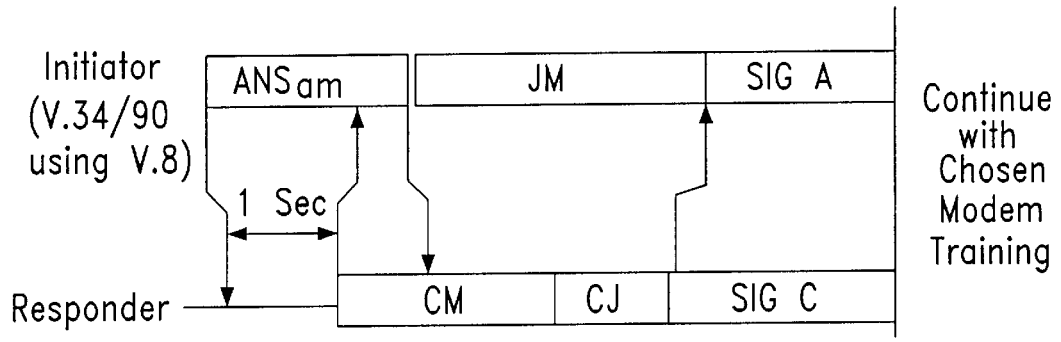
FIGS. 3A–3D depict calling scenarios for an auto-negotiating modem responding to a call from various modem initiators.

If, at step 206, the multimode modem determines that it has received an amplitude modulated 2100 Hz tone (i.e., an "$ANS_{am}$" in accordance with V.8), then the responder determines that the initiator is a V.8 modem. At step 208, the responder replies with the V.8 "CM" sequence indicating its available modem types, and continues with modem negotiation in accordance with V.8 (see FIG. 3A).

If, at step 210, the multimode modem determines that it has received an ESD/ESCD/ANS tone (i.e., a 2100 Hz tone without amplitude modulation) for one second, then, at step 212, the responder transmits a P1800 tone with phase reversals (the STU-III "alternate mode" signaling response).

While transmitting the P1800 tone, the auto-negotiating multi-mode modem will wait up to 150 msec after detecting a loss of ESD/ESCD/ANS to detect either a V.32 "AC" or a STU-III Message A in response. If the responder detects a loss of ESD/ESCD/ANS at step 214, then the responder starts a 150 msec timer at step 216.

Figure 3B:
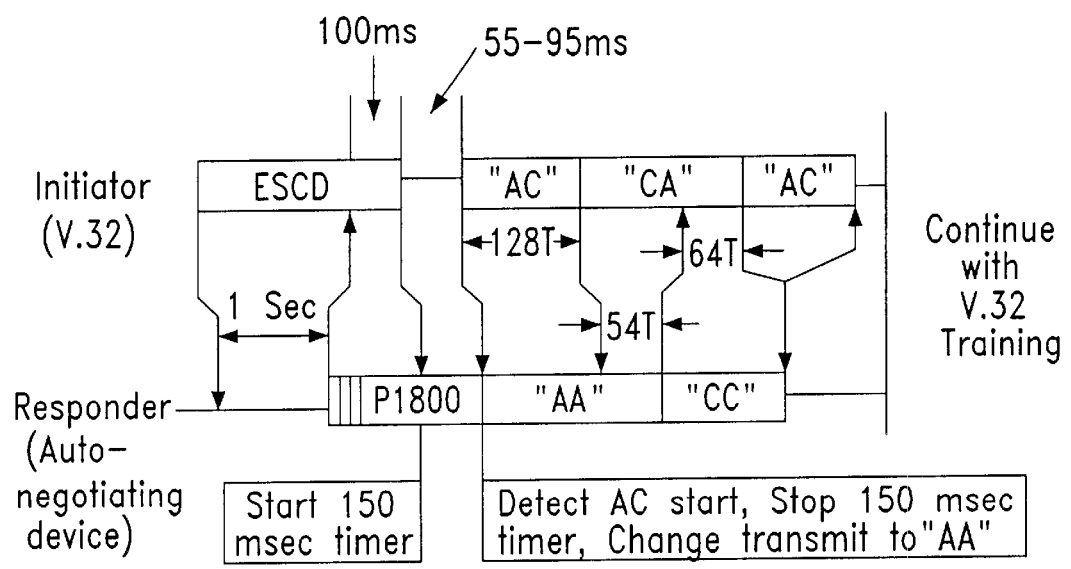

If, at step 218, the responder detects a V.32 "AC" within the 150 msec window, then the responder determines that the far-end modem is a V.32 modem. At step 220, the responder stops the 150 msec timer, and changes the P1800 Hz transmission to the V.32 "AA". At step 222, the responder proceeds with V.32 training and the appropriate security signaling (see FIG. 3B).

Figure 3C:
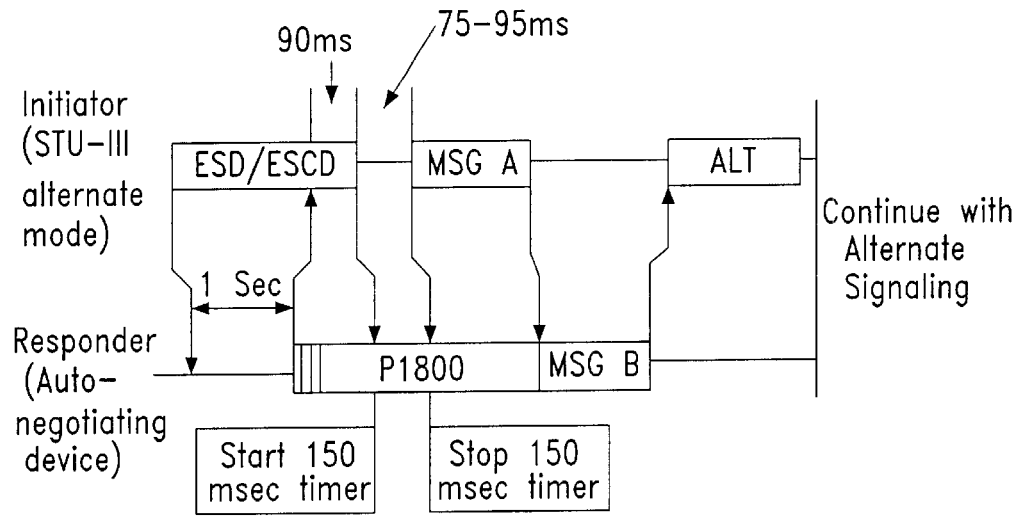

If, at step 224, the responder detects the start of STU-III Message A within the 150 msec window, then the responder determines that the far-end modem is a STU-III modem operating in alternate mode. At step 226, the responder stops the 150 msec timer, and transmits Message B. At step 228, the responder completes STU-III alternate mode signaling (see FIG. 3C).

Figure 3D:
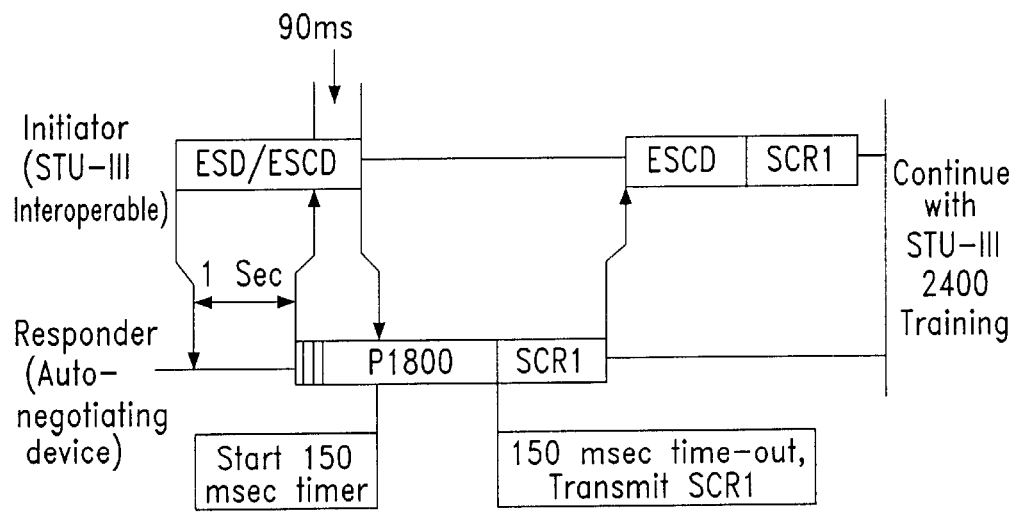

If, at step 230, the responder determines that it has not detected either a V.32 "AC" response or a STU-III Message A response within the 150 msec window, then the responder determines that the far-end modem is a STU-III modem in interoperable mode. At step 232, the responder transmits the SCR1 and, at step 234, completes STU-III interoperable mode signaling (see FIG. 3D).

The present invention is possible since a commercial V.series modem is looking for energy at 1800 Hz. Since the transmission of an 1800 Hz tone with 45-degree phase reversals would be in violation of V.32 specifications (which require a pure 1800 Hz tone), the V.series initiator will ignore the 45 degree phase shifts present in a P1800 Hz tone, and consider the tone to be the expected "AA" tone. Also, the V.series initiator ignores the phase reversals in the "alternate mode" P1800 Hz tone, which occur in the first 80 msec of reply, since it looks for phase reversals only after it transmits "AC", which can occur no sooner than 155 msec after the start of the P1800 Hz tone.

In a preferred embodiment, an auto-negotiating, multi-mode modem according to the present invention can be implemented in a digital signal processor (DSP) coupled to a telephone network via analog-to-digital (A/D) and digital-to-analog (D/A) converters and a telephone hybrid. The telephone hybrid converts the two-wire interface used in analog telephone circuits into separate transmit and receive signals (i.e., four-wire). These four-wire signals are then converted between the analog domain and the digital domain with A/D (for the receive path) and D/A (for the transmit path) converters. The resulting digital representation of the analog signals is processed by a DSP. The DSP analyzes received signals to determine frequency and phase information, and generates transmit signals of the proper frequency and phase to convey the appropriate signaling. By analyzing and manipulating the frequency and phase of the signals, the DSP performs a modulator/demodulator (modem) function.

To support digital telephone interfaces, like ISDN, the telephone hybrid and D/A and A/D converters are eliminated, and are replaced with an ISDN network interface function. The DSP would then also include a companding function to interface to the A-law or $\mu$-law coding.

The methods of the present invention can be also be implemented in software, and stored as computer-executable instructions on a fixed or removable computer-readable medium, such as a microprocessor, computer hard drive, floppy disk, or the like.

Thus there have been described apparatus and methods for determining an operational mode of a far-end modem. Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

I claim:

1. A method for identifying a far-end modem type, comprising:
   receiving a 2100 Hz tone from a far-end modem;
   in response to receiving the 2100 Hz tone, transmitting a V.8 $ANS_{am}$ tone to the far-end modem;
   receiving a response signal from the far-end modem in response to the transmitted V.8 $ANS_{am}$ tone; and
   determining from the response signal whether the far-end modem is a commercial modem or a secure modem.

2. The method of claim 1, wherein determining whether the far-end modem is a commercial modem or a secure modem comprises determining whether the far-end modem is a V.series modem or a future secure voice system modem.

3. The method of claim 2, wherein determining whether the far-end modem is a commercial modem or a secure modem comprises:
   determining whether the response signal is a V.8 CM tone; and
   if the response signal is a V.8 CM tone, determining that the far-end modem is a V.8 modem.

4. The method of claim 1, wherein determining whether the far-end modem is a commercial modem or a secure modem comprises:
   determining whether the response signal has a nominal frequency of about 1800 Hz; and
   if the response signal has a nominal frequency of about 1800 Hz, determining from the response signal whether the far-end modem is a V.32 modem or a secure modem.

5. The method of claim 4, wherein determining whether the far-end modem is a V.32 modem or a secure modem comprises:
   determining whether the response signal includes phase shifts; and
   if the response signal does not include phase shifts, determining that the far-end modem is a V.32 modem.

6. The method of claim 4, wherein determining whether the far-end modem is a V.32 modem or a secure modem comprises:
   determining whether the response signal includes phase shifts; and
   if the response signal includes phase shifts, determining that the far-end modem is a secure modem.

7. The method of claim 1, further comprising:
   determining from the response signal, an operational mode of the far-end modem.

8. The method of claim 7, wherein determining the operational mode of the far-end modem comprises:
   determining whether the response signal includes phase reversals; and
   if the response signal includes phase reversals, determining that the far-end modem is a future secure voice system modem in alternate mode.

9. The method of claim 7, wherein determining the operational mode of the far-end modem comprises:
   determining whether the response signal includes a 128 dibit gap; and
   if the response signal includes a 128 dibit gap, determining that the far-end modem is a future secure voice system modem in half-duplex mode.

10. The method of claim 7, wherein determining the operational mode of the far-end modem comprises:
   determining whether the response signal includes phase reversals;
   determining whether the response signal includes a 128 dibit gap; and
   if the response signal does not include phase reversals or a 128 dibit gap, determining that the far-end modem is a future secure voice system modem in interoperable mode.

11. A method for determining a far-end modem type, comprising:
   receiving a 2100 Hz tone from a far-end modem,
   in response to receiving the 2100 Hz tone transmitting to the far-end modem a P1800 Hz tone with phase reversals;
   receiving a response signal from the far-end modem in response to the transmitted P1800 Hz tone; and
   determining from the response signal whether the far-end modem is a commercial modem or a secure modem.

12. The method of claim 11, wherein determining from the response signal whether the far-end modem is a commercial modem or a secure modem comprises:

determining whether the far-end modem is a V.32 modem or a secure modem.

13. The method of claim 12, wherein determining whether the far-end modem is a V.32 modem or a secure modem comprises:

determining whether the response signal includes a V.32 AC; and if the response signal includes a V.32 AC, determining that the far-end modem is a V.32 modem.

14. The method of claim 11, further comprising:

determining whether the response signal includes a future secure voice system ("FSVS") Message A; and if the response signal includes an FSVS Message A, determining that the far-end modem is an FSVS modem in alternate signaling mode.

15. The method of claim 11, further comprising:

determining whether the response signal includes a V.32 AC;

determining whether the response signal includes a future secure voice system ("FSVS") Message A; and if the response signal includes neither a V.32 AC nor an FSVS Message A, determining that the far-end modem is an FSVS modem in interoperable mode.

16. The method of claim 11, further comprising:

monitoring an incoming channel for energy at 2100 Hz; and if 2100 Hz energy is present in the incoming channel for at least about one second, then determining whether the far-end modem is a V.32 compliant commercial modem or a secure modem in interoperable mode or alternate mode.

17. A method for determining a far-end modem type, comprising:

monitoring an incoming channel for the presence of any of 1800 Hz energy or 2100 Hz energy;

if 1800 Hz energy is present in the incoming channel for at least about one second, then determining that the far-end modem is a secure modem in half-duplex mode; and if 2100 Hz energy is present in the incoming channel for at least about one second, then determining whether the far-end modem is a V.32 modem or a secure modem in interoperable mode or alternate mode by transmitting a P1800 Hz tone to the far-end modem in response to the presence of the 2100 Hz energy.

18. The method of claim 17, further comprising:

monitoring the incoming channel for the presence of a V.8 $ANS_{am}$ tone; and if a V.8 $ANS_{am}$ tone is present in the incoming channel, then determining that the far-end modem is a V.8 modem.

19. A computer-readable medium having stored thereon computer executable instructions for performing a method for identifying a far-end modem type, comprising:

transmitting a V.8 $ANS_{am}$ tone to the far-end modem;

receiving a response signal from the far-end modem in response to the transmitted V.8 $ANS_{am}$ tone; and determining from the response signal whether the far-end modem is a commercial modem or a secure modem.

20. A computer-readable medium having stored thereon computer executable instructions for performing a method for identifying a far-end modem type, comprising:

receiving a 2100 Hz tone from a far-end modem;

in response to receiving the 2100 Hz tone, transmitting to the far-end modem a P1800 Hz tone with phase reversals;

receiving a response signal from the far-end modem in response to the transmitted P1800 Hz tone; and determining from the response signal whether the far-end modem is a commercial modem or a secure modem.

* * * * *